United States Patent [19]

Poppelbaum

[11] 4,156,916

[45] May 29, 1979

[54] PULSE BURST PROCESSING SYSTEM AND APPARATUS

[75] Inventor: Wolfgang J. Poppelbaum, Urbana, Ill.

[73] Assignee: The University of Illinois Foundation, Urbana, Ill.

[21] Appl. No.: 753,013

[22] Filed: Dec. 21, 1976

Related U.S. Application Data

[63] Continuation of Ser. No. 536,909, Dec. 27, 1974, abandoned.

[51] Int. Cl.² ............................ G06J 1/00; H03K 4/02
[52] U.S. Cl. .................................... 364/602; 307/261; 307/356; 328/28; 328/146; 328/186; 340/347 AD; 364/607
[58] Field of Search ...................... 235/150.5, 181, 193; 325/38 R; 328/13, 146, 147, 150, 151, 186, 158, 28, 35; 307/231, 350, 355, 356, 261, 360, 361, 362, 227; 340/347 AD; 364/600, 602, 807, 607, 605, 811

[56] References Cited

U.S. PATENT DOCUMENTS

| | | | |
|---|---|---|---|
| 3,351,873 | 11/1967 | Kimura | 307/228 X |
| 3,404,261 | 10/1968 | Jespers et al. | 235/181 |
| 3,479,496 | 11/1969 | Buesch et al. | 328/146 X |
| 3,510,603 | 5/1970 | Gaerttner et al. | 340/347 AD |
| 3,612,845 | 10/1971 | Lawlor | 235/150.3 X |
| 3,614,470 | 10/1971 | Ruthenberg et al. | 307/228 |
| 3,838,413 | 9/1974 | Wehrmann | 235/150.5 X |

*Primary Examiner*—Joseph F. Ruggiero
*Attorney, Agent, or Firm*—Daniel M. Rosen

[57] ABSTRACT

We describe a method and apparatus for handling information coded in the form of groups of pulses in sequential time slots forming blocks, each block having the same number of time slots. In this pulse transmission system an analog signal is converted to the above pulse code for transmission, and reconverted to analog form by an integration process. The process and apparatus are also adapted to arithmetic operations. An averaging device, employed in both transmission and arithmetic systems, includes a shift register provided with means for producing a current corresponding to the number of stages of the shift register in a given state.

2 Claims, 26 Drawing Figures

| 1ST BLOCK | 2ND BLOCK | 3RD BLOCK | --- | 10TH BLOCK |
|---|---|---|---|---|
| .00 | .01 | .02 | | .09 |
| .10 | .11 | .12 | | .19 |
| .20 | .21 | .22 | | .29 |
| .30 | .31 | .32 | | .39 |
| .40 | .41 | .42 | | .49 |
| .50 | .51 | .52 | | .59 |
| .60 | .61 | .62 | | .69 |
| .70 | .71 | .72 | | .79 |
| .80 | .81 | .82 | | .89 |
| .90 | .91 | .92 | | .99 |
| 4 | 4 | 3 | ------- | 3 |

PULSE BURST PROCESSING SYSTEM AND APPARATUS

The invention herein described was made in the course of or under a contract with the Department of the Navy.

This is a continuation of application Ser. No. 536,909, filed Dec. 27, 1974, now abandoned.

THE INVENTION

This invention relates to pulse code transmission and pulse code arithmetic systems and methods, and is particularly directed to a process and apparatus for handling pulses in the form of pulse groups occurring in sequential time slots of blocks of such time slots.

In the stochastic processing techniques, disclosed for example in "Stochastic Computing Elements and Systems", W. J. Poppelbaum, C. Afusco and J. W. Esch, *Proceedings Of the Fall Joint Computer Conference*, 1967, pages 635-644, random and quadi random pulse sequences are employed for numerical practices. In these stochastic processing techniques, simple arithmetic units can be employed for processing, at the cost of converting all information into probabilistic sequences. The units consist essentially of AND's for multiplication, OR's for addition, etc. Such systems are particularly attractive, especially for parallel processing techniques, for example, picture processors. Such probabilistic systems are diametrically opposed to the standard weighted binary deterministic systems generally employed. In such probabilistic systems, however, the precision increases linearly with the square of the number of time slots used, so that, for example, a 512×512 point picture process with a 10C megahertz clock rate is limited to an accurace 10% in online applications of 30 frames per second.

The present invention is directed to a pulse transmission and processing method and apparatus which represents a middle ground between the completely random stochastic system, and the more conventional deterministic system. The process, in accordance with the invention, thus overcomes the relatively slow gain of precision of stochastic systems with the sequence length, while retaining the noise tolerant characteristics of stochastic systems. The system and process in accordance with the invention is capable of operating, for example, in arithmetic operations, at speeds intermediate between those of the stochastic and deterministic systems, while having a noise tolerance greater than that of the deterministic systems. In addition, the hardware required in the system in accordance with the invention, is simplified with respect to that employed in a deterministic system.

In accordance with the invention, pulse coded signals are handled in the form of pulse "bursts" in "blocks" of time slots. The bursts of pulses, which may correspond to analog or arithmetic information, are carried and handled in sequential time slots of these "blocks", with all blocks having an equal number of time slots.

In one embodiment of the invention, analog information is converted to the pulse "bursts" for example, by a comparison of the analog signal with a step wave. Reconversion of the pulse bursts to analog form merely involves an integration process.

In arithmetic operations, the pulse bursts may correspond to numerical data. For example, the number of pulses in the time slots of a given pulse block may correspond linearly to the number to be represented, or alternatively, the average number of pulses in the time slots of a plurality of pulse blocks may correspond to the numerical data, for greater accuracy in processing.

In accordance with the invention, it has been found that a particularly useful basic circuit, useful in transmission and arithmetic system in accordance with the invention, is comprised of a shift register, the stages of which are coupled by suitable means to provide an output current having an amplitude corresponding to the number of stages of the shift register in a given state. For most operations the correspondence is linear, although the device is adaptable to function generation when a nonlinear correspondence is employed. This circuit is hereafter referred to as a "block sum register".

In accordance with the invention, a block sum register may be employed as a step wave generator, readily enabling encoding of analog signals as well as numerical data. In a particularly advantageous arrangement, an encoder may employ a second block sum register to generate a Vernier step wave added to the primary step wave, so that the accurace in arithmetic processing techniques is improved.

While logic circuits may be employed in arithmetic processing techniques in accordance with the invention, block sum registers are readily adaptable to the adding or subtracting, multiplying and dividing of pulse bursts, simplifying the hardware required in the processing of these pulse bursts.

The pulse "burst" signals in accordance with the invention are also readily adaptable to indication systems.

In order that the invention will be more clearly understood, it will now be disclosed in greater detail with reference to the accompanying drawings, wherein.

In the techniques and apparatus in accordance with the invention, pulses are produced in determined time slots, these slots being assembled into blocks, and the time slots of each block in which pulses occur are in a successive series. For example, if in a given system blocks having 10 time slots are employed, then from 0 to 10 pulses may appear in each of the blocks, with the pulses in each block occurring in an adjacent series of time slots. The sequentially occurring pulses in a pulse block are hereinafter referred to as a pulse "burst", and hence the present invention may be referred to as a Pulse "Burst" Processing System And Apparatus. As will be explained in greater detail in the following paragraph, the pulse bursts correspond in some way to data, for example, input data applied to the system, or data derived in the system. In some arrangements and techniques in accordance with the invention, the bursts occurring in the individual blocks may correspond separately to the data, while in other embodiments of the invention, blocks may be correlated so that the pulses occurring in a plurality of blocks may together correspond to different data. For example, in burst processing techniques concerning decimal data, information relating to a given piece of data may be represented by the total information in 10 blocks, in order to ensure more accurate processing, and this group of 10 blocks may be referred to as a "superblock". Similarly, for example, for purposes of even greater accuracy, data in a plurality of "superblocks", for example, 10 "superblocks", may be correlated, in which case the even larger grouping of the blocks of 10 superblocks may be referred to as a "hyperblock".

Figure 1:
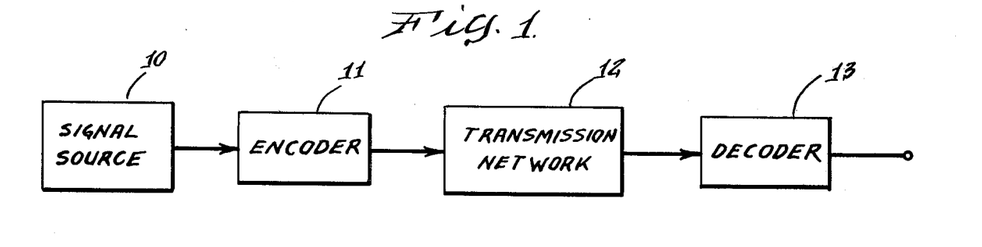
FIG. 1 is a block diagram of a simplified pulse transmission system, which may be employed in one embodiment of the invention.

In one embodiment of the invention, burst processing may be employed as a pulse code modulation system, for example, for the transmission of data corresponding, for example, to audio or video signals. Thus, for example, as illustrated in FIG. 1, signals such as audio or video signals from a conventional source 10 are applied to an encoder 11 for conversion to a pulse burst code as described above. The output of the encoder 11 is then transmitted by a conventional transmission system 12 to a decoder 13, for reconversion to analog form.

Figure 2:
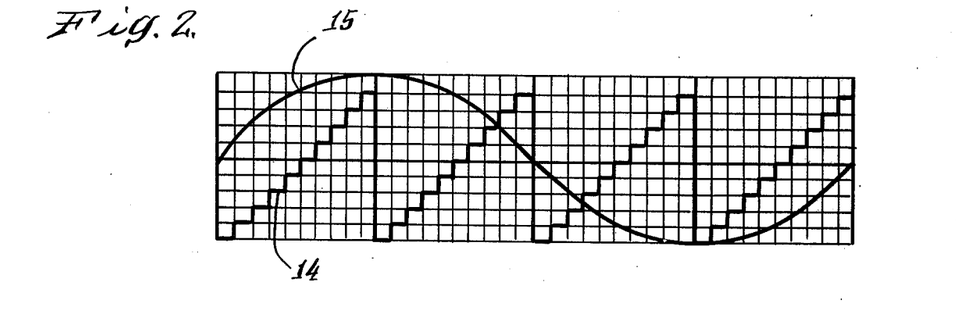
FIG. 2 is a simplified illustration of a technique for encoding an analog signal, in accordance with the invention.
Figure 3:
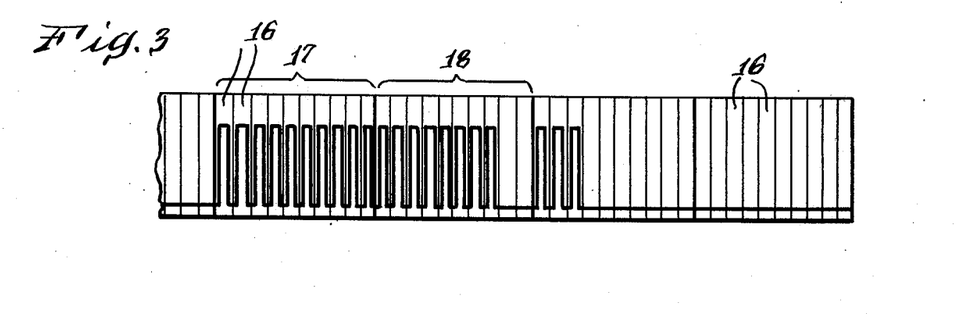
FIG. 3 is an illustration of a coded pulse sequence in accordance with the analog signal of FIG. 2.

In one convenient process for encoding the analog signal in accordance with the invention, as illustrated in FIG. 2, a repetitive step function 14 is produced, with each cycle of the step function signal having the same number of steps, and these steps preferably having equal amplitudes. The step function is compared with the analog input signal 15, so that a pulse is produced at each step of the step function signal at which the level of the analog signal is greater than the instantaneous level of the step of the step function signal. As a consequence, a pulse sequence, as illustrated in FIG. 3, is generated. In the arrangement of FIG. 2, each cycle of a step functional signal has 10 steps, and hence, in accordance with the terminology employed in the present specification, the pulse blocks each have 10 time slots. In the illustrated embodiment, as shown in FIG. 3, pulses occur in all 10 time slots 16 of the first block 17, in the first eight time slots of the secoond block 18, etc. The pulses illustrated in FIG. 3 are transmitted by any conventional technique.

Figure 4:
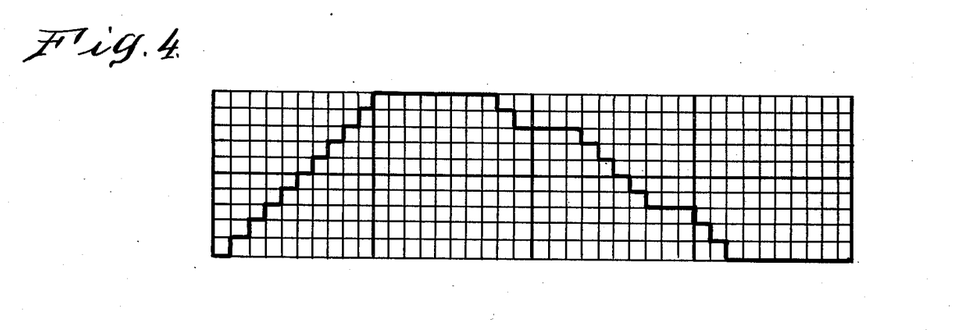
FIG. 4 is a simplified illustration of the results of integration of the pulse sequence of FIG. 2.

In order to decode the pulses illustrated in FIG. 3, in accordance with the invention, an integration technique may be employed, and the curve illustrated in FIG. 4 represents the integration of the pulse signal of FIG. 3. It will be noted that the integrated pulse signal corresponds generally to the analog signal 15 shown in FIG. 2. The parameters employed in the example of FIGS. 2-4 have been selected in order to clearly illustrate the pulse burst technique in accordance with the invention and it will, of course, be apparent that the correspondence between the output analog wave and the input analog wave will be much closer as the stepping frequency of the step wave signal is increased. For example, it has been shown that with a step frequency in the step function signal that is 40 times the upper frequency of the analog signal, good unstandability is possible when the analog signal is an audio signal. This corresponds to twice the minimum sampling rate dictated by Nyquist's theorem.

The burst processing technique illustrated in FIGS. 1-4 has the advantage of low cost, and although the step function signal may be generated by means of a clock signal, no synchronization is required.

The pulse signals may be produced when the instantaneous level of the analog signal 14 differs from the level of the step function signal in either direction, so that, alternatively to the arrangement illustrated in FIGS. 2-4, the pulses may be generated when the level of the step function signal exceeds that of the analog signal.

Figures 5, 6, 7:
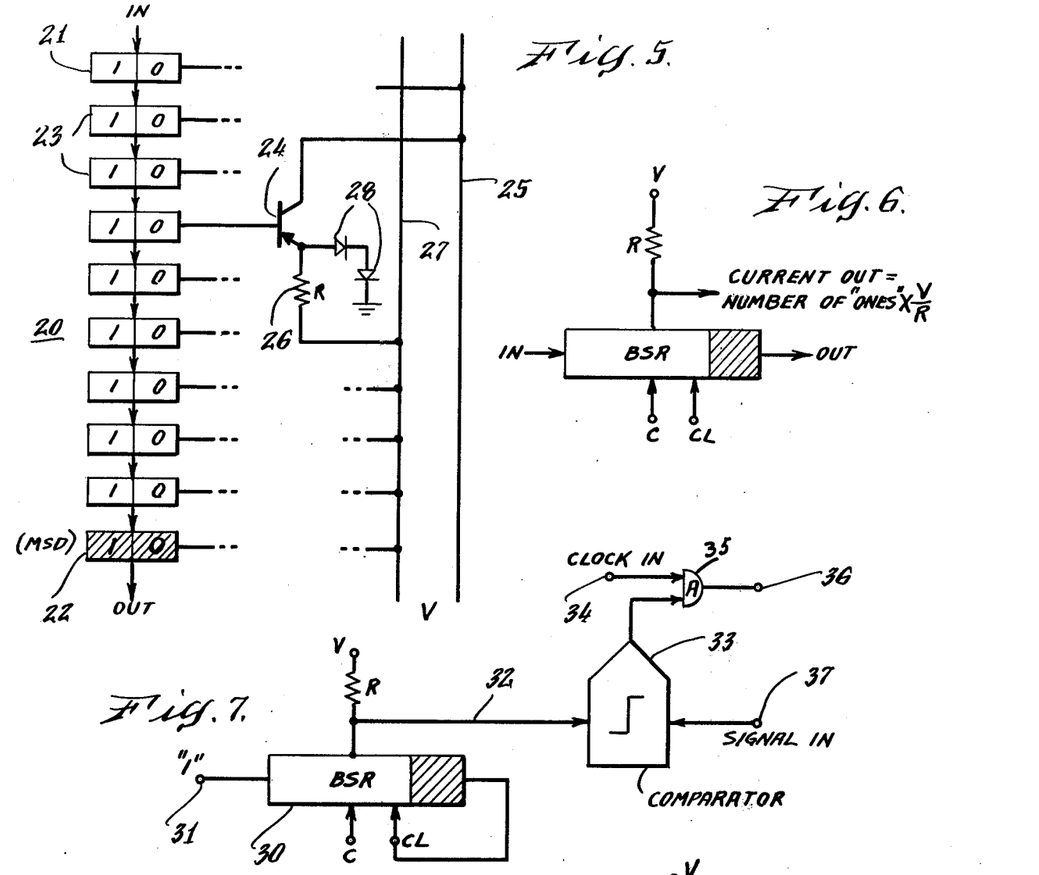
FIG. 5 is an illustration of a block sum register, in accordance with the invention.
FIG. 6 illustrates the symbol employed for the block sum register of FIG. 5.
FIG. 7 is a simplified illustration of a pulse encoding system, in accordance with the invention, employing a block sum register in the comparator.

A particularly useful circuit, adaptable to serving a number of functions in the burst processing system in accordance with the invention, is illustrated in FIG. 5. This circuit which is hereinafter referred to as a "block sum register", is comprised of a conventional shift register 20 having an input stage 21, an output stage 22 and a plurality of intermediate stages 23. When the system in accordance with the invention is designed as a decimal system, the shift register 20 conveniently has 10 stages. The shift register is also provided in the conventional manner with a ock terminal and a clear terminal (not shown).

Means are provided in the circuit of FIG. 5, for producing a current corresponding to the sum of the stages of the shift register having pulses stored therein. For example, each stage of the register may be provided with a transistor 24 having its base connected to the output of the respective stage, its collector connected to a common current summing bus 25, and its emitter connected by way of a resistor 26 to a common source of voltage by way of lead 27. The emitter of the transistor 24 is also connected to ground reference by way of diodes 28. Only one of the transistor circuits is illustrated in FIG. 5, for the sake of clarity, it being understood that a similar circuit is connected to each of the outputs of the shift register. In the arrangement of FIG. 5, it will be apparent that the current in the summing bus 25 has a magnitude corresponding to the states of the stages of the shift register, that is, the sum of the current produced therein by all stages of the shift register having a "1" stored therein. In other words, the current in the bus 25 resulting from a "1" stored in any stage of the register is V/R wherein V is the voltage supply to the line 27 and R is the resistance of the resistor 26, and the total current in the bus 25 will thus be V/R times the number of stages of the register that have "1's" stored therein.

In view of the versatility of the circuit of FIG. 5 in various arrangements in accordance with the invention, it will hereinafter be represented by the symbol illustrated in FIG. 6. In this figure the resistor R represents the individual resistors 26 in the arrangement of FIG. 5, the terminal C represents the clock terminal, the terminal CL represents the clear terminal, and the terminal V represents the terminal to which the voltage V is applied, i.e. the line 27.

As illustrated in FIG. 7 the block sum register 30 may be employed in an encoder for the system illustrated in FIG. 1. In this arrangement, a constant logic "1" signal is applied to the input stage, at terminal 31, of the block sum register 30, and the output of the shift register in the block sum register is connected to the clear terminal thereof. As a consequence, the output of the block sum register on line 32 will be a repetitive step function, having a number of steps corresponding to the number of stages of the shift register in the block sum register and each stepping frequency determined by the clock signal applied to the clock terminal. The output of the block sum register is compared with the signal input in a comparator 33. The clcok pulses may also be applied to terminal 34 connected to one input of AND gate 35, the other input of the AND gate 35 being connected to the output of the comparator 33. The output of the AND gate 35, at terminal 36 thereby is in the form of a burst signal corresponding to the input signal applied to the comparator 33 at terminal 37.

Figure 8:
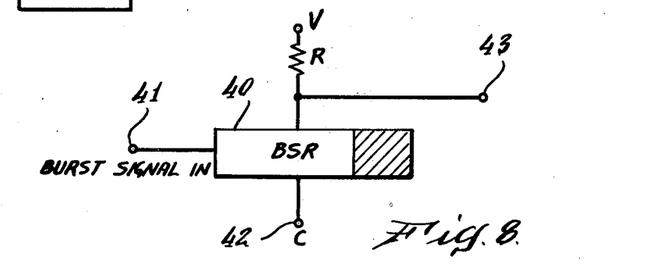
FIG. 8 is a simplified illustration of an integrator employing a block sum register, in accordance with the invention.

A block sum register may also be employed as the decoder for the arrangement illustrated in FIG. 1, since a block sum register in accordance with the invention can act as an integrator which loses its memory after a number of clock pulses corresponding to the number of stages in the shift register therein. Referring to FIG. 8, the burst signals of the form illustrated in FIG. 3, are applied to the input stage of a block sum register 40 at terminal 41. The output and clear terminals of the shift register of the block sum register are unconnected and a clock signal may be applied to the clock terminal of the shift register at terminal 42. It is not necessary that this clock signal be synchronized with the clock signal employed in the encoder. The output of the block sum register at terminal 43 therefore corresponds to the number of "1's" stored in the shift register at any given time, and hence it is apparent that the block sum register serves as an integrator, providing an output corresponding to the sum of "1's" applied to the block sum register during the preceding N clock periods, wherein N is the number of stages in the shift register.

The burst processing system in accordance with the invention is also adaptable to arithmetic operations. Thus, it is quite apparent that, assuming a pulse block having 10 time slots, the number of pulses in the block will correspond directly to any integer from 0 to 10. A more precise arithmetic correspondence may be obtained, for example, by correlating the pulses in a superblock with the number to be represented. In this case, the number of pulses in each block is selected so that the average number of pulses in the blocks of the superblock is equal to the number to be represented. For example, if the superblock is comprised of 10 blocks, and the number 3.4 is to be represented, four pulses will be inserted in the time slots of four of the blocks, and three pulses will be inserted in the time slots of each of the remaining six blocks of the superblock. The average number of pulses in all the blocks is then 3.4, the number to be represented. Similarly, if the number 4.2 is to be represented, five pulses will be stored in the time slots of each of two of the blocks of the superblock, and four pulses will be stored in the time slots of each of the remaining eight blocks of the superblock. In this case, the average number of pulses in the blocks is 4.2, the number to be represented. It is apparent that the accuracy of representation of numbers can be increased, by combining superblocks to form hyperblocks for example, including 10 superblocks each. Thus, assuming each block includes 10 time slots, each superblock includes 10 blocks and each hyerblock includes 10 superblocks. A block can represent a number with 10% accuracy, a superblock can respresent a number with 1% accuracy and a hyperblock can represent a number with 0.1% accuracy. The accuracy, can, of course, be increased by further combination of the hyperblocks, etc. In each case, of course, the number of pulses in the time slots of the blocks are selected so that the average number of pulses in the blocks correspond to the number to be represented.

Figure 9:
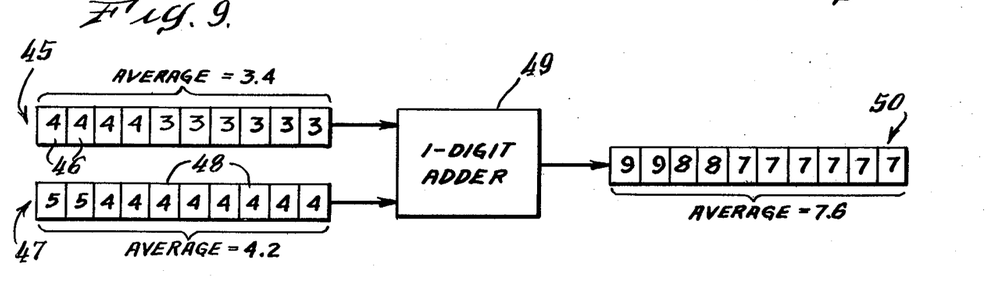
FIG. 9 is a simplified illustration of a technique for adding pulse bursts in accordance with the invention.

The coding of the blocks in accordance with the invention, as above described, enables the provision of a system and process readily adaptable to arithmetic operations. Thus, referring to FIG. 9, assume that in one superblock 45 four pulses are stored in each of four blocks 46, and three pulses are stored in the remaining six blocks, each, for an average of 3.4. Further, assume that in another superblock 47, five pulses are stored in each of two blocks 48 and four pulses are stored in the remaining eight blocks, for an average of 4.2. If the number of pulses in the blocks 45 and 47 are added, for example, in a one digit adder 49, an output superblock 50 will result having nine pulses in each of two blocks, eight in each of two blocks, and seven pulses in each of the remaining six blocks. The average of the pulses in the superblock 50 is thus 7.6, which is the sum of the average number of pulses in the superblocks 45 and 47. It is thus apparent that the burst processing technique can be employed for arithmetic operations, and that the accuracy of the arithmetic operations is dependent only upon the number of blocks, superblocks, hyperblocks, etc. employed since an averaging technique is employed.

Figure 10A:
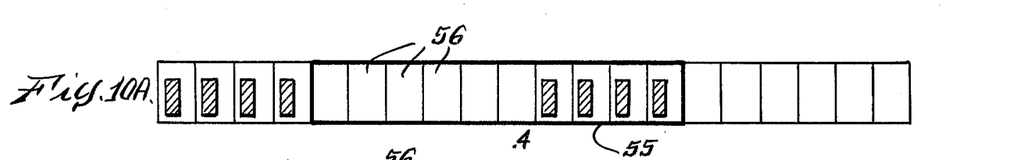
FIGS. 10a and 10e illustrate the pulses in pulse blocks as a function of time, showing the constant block sum property of periodic bursts.
Figure 10B:
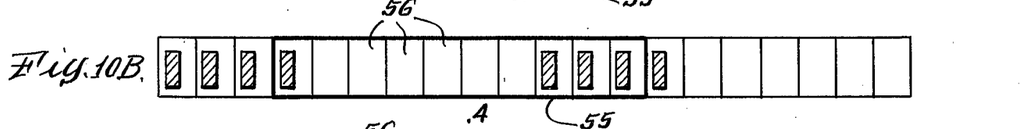
Figure 10C:
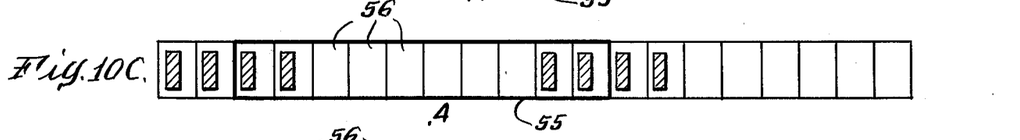
Figures 10D, 10E:
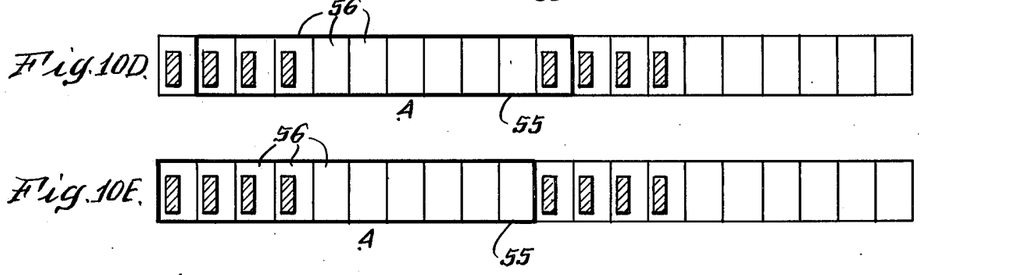

Before proceeding with a detailed explanation of the method and apparatus for employing burst processing in arithmetic operations, it must be emphasized that the output of a block sum register as disclosed above is constant, as long as the number of pulses in the bursts remain equal. Thus, referring to FIG. 10a, assume a block 55 of 10 time slots 56 has a pulse stored in each of the last four stages, indicated by the numeral 56. In this case, the output of a block sum register will be 4 V/R. At the time of the next clock pulse, as illustrated in FIG. 10b, one pulse will have been dropped at the end of the shift register, and another pulse will have been added at the beginning of the shift register, so that the total output of the block sum register remains at 4 V/R. FIGS. 10c–10e represent the pulses stored in the shift register after succeeding clock pulses, and it is evident that there will always be four pulses stored in the shift register as long as the burst remains equal, and hence the output of the block sum register will remain at 4 V/R. Thus, it is evident that, with respect to the output of the block sum register, it is not necessary to provide synchronization of pulses applied to the input of the block sum register.

In order to encode arithmetic data to produce pulse burst signals, for use in arithmetic processing the system of FIG. 7 may be employed. In this arrangement, the input signal, which may be a d.c. signal or a time varying signal, has a level that is a function, usually linear, of the number to be represented. In this arrangement, it is evident that burst groups will be continually produced in sequential pulse blocks, the number of pulses in the pulse block, of course, corresponding to the level of the input signal. The precision of the encoding can, of course, be increased by increasing the number of steps in each cycle of the step function signal, but when it is desired to include data on a decimal basis, of course, only 10 steps are employed in each cycle of the step function signal, so that the pulse blocks each have 10 time slots. Thus, when the system of FIG. 7 is employed for encoding arithmetic data, the precision of encoding is only 10%.

Figures 11, 12, 13:
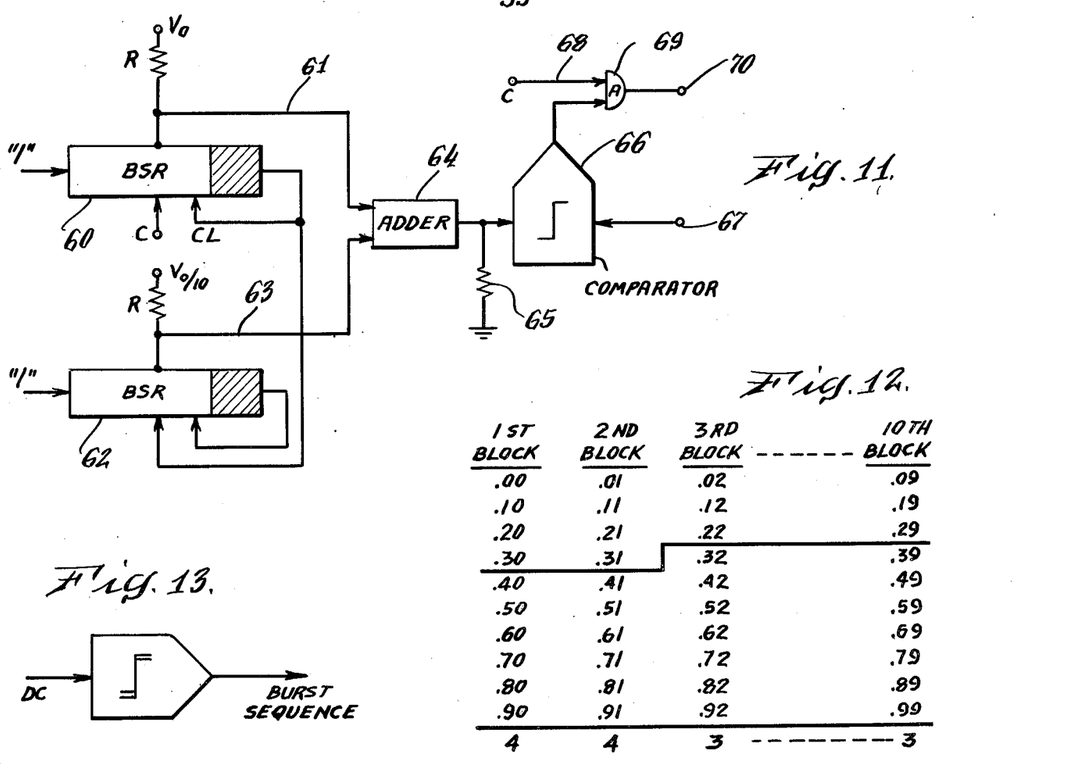
FIG. 11 is a simplified illustration of a Vernier encoder, in accordance with the invention.
FIG. 12 is a table illustrating the operation of the circuit of FIG. 11.
FIG. 13 shows a symbol employed hereinafter to denote the Vernier encoder of FIG. 11.

In order to increase the precision of encoding, the arithmetic data may be encoded in a superblock, i.e., a plurality of blocks. This concept was discussed above with reference to the adder illustrated in FIG. 9. An embodiment of the invention for encoding in the superblock, hereinafter referred to as a vernier encoder, is illustrated in FIG. 11. In this circuit, the first block sum register 60 is supplied a voltage $V_0$, the resistors of the block sum register having a value R. A constant voltage of amplitude "1" is applied to the input stage in the block sum register 60, a clock signal is applied to the clock terminal C, and the last stage of the block sum register is connected to the clear terminal CL thereof, so that the output generated by the block sum register 60 appearing on line 61 will be a repetitive step function signal. The output of the last stage of the block sum register is also applied to the clock terminal of a second block sum register 62. The block sum register 62 is also provided with a logic "1" constant voltage at its input stage, and the output stage of the shift register of this circuit is similarly connected to its clear terminal. The block sum register 62, however, is provided with a voltage that is a submultiple of the voltage applied to the block sum register 60 corresponding to the number of stages of the block sum register 60. Thus, in a decimal system, the shift register of the block sum register 60 has 10 stages, and hence the voltage supply to the block sum register 62 is $V_0/10$. The shift register of the block sum register 62 has the same number of stages as the shift register of block sum register 60. Consequently, a step function signal will be provided at the output line 63 of the block sum register 62, this step function signal having steps that are a fraction, for example 1/10, of the amplitude of the steps of the block sum register 60, and also having a stepping frequency that is the submultiple of the stepping frequency of the block sum register corresponding to the number of the stages of the shift register thereon, for exsample, 1/10 in a decimal system.

The currents on the two lines 61 and 63 are added in a current adder 64, so that the voltage appearing at the terminal P at the output the adder 64, across the resistor 65, is a step wave signal in which the levels of the steps vary cyclically. For example, in a decimal system, the levels of the steps in adjacent cycles will incrementally increase throughout a period of 10 cycles and then return to their original levels, the incremental increase corresponding to 1/10 of the amplitude of a step.

This voltage is compared, in the comparator 66, with the signal to be decoded applied to the terminal 67. As in the arrangement of FIG. 7, the clock signals at terminal 68 are gated by the output of the comparator 66 at the AND gate 69, to produce the superblock pulse signals at the output terminal 70 at the AND gate 69. An example of the voltages appearing at the terminal P, normalized to 1, is illustraed in FIG. 12, wherein the column in the table of this figure corresponds to the normalizied voltages at the indicated pulse blocks and the sequential rows denote the normalized voltage levels at the point P in the time slots of the blocks. FIG. 12 also illustrates the operation of the circuit of FIG. 11 in producing pulses in the time slots of the blocks such that the average number of pulses corresponds to the input signal. Thus, if the input signal has a level of 0.32, a pulse will be produced only at a step at which the level of the step is less than 0.32. Consequently, in the first two blocks, pulses are produced in four time slots each, while in the remainder of the blocks, only three pulses are produced in the time slots of each block. The dividing line at which pulses are produced is indicated by the line extending through the columns of the figure and the pulses produced in each block are indicated at the bottom of the corresponding column. It is thus evident that the average number of pulses produced in the blocks, in this example, is 3.2, which corresponds to the input signals to be encoded.

It is, of course, apparent that the concept of the Vernier encoder of FIG. 11 can be further extended, to provide an additional block sum register stepped by the output of the block sum register 62, and having a voltage input of $V_0/100$, the output of the third block being added to the outputs of the other blocks, in order to encode the input signal in a hyperblock for even greater accuracy. In principle, this concept may be even further extended for greater accuracy.

Since the Vernier encoder of the type illustrated in FIG. 11 is also versatile in burst processing systems, in further embodiments in accordance with the invention this circuit will be depicted by the symbol illustrated in FIG. 13.

Figure 14:
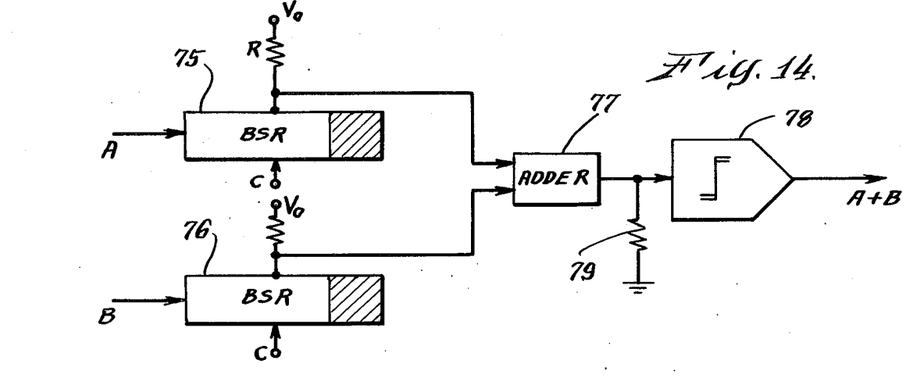
FIG. 14 is an illustration of an adder in accordance with the invention, employing block sum registers.

One form of circuit that may be employed for adding or subtracting in accordance with the invention, is illustrated in FIG. 14. In this circuit two block sum registers 75 and 76 are provided, each having a voltage supply $V_o$ and having clock pulses supplied to them. The two burst signals A and B are applied to the input stages of the shift registers of the block sum registers 75 and 76, respectively. The output terminals and clear terminals of the shift registers of the block sum registers are not connected. The output currents of the two block sum registers are added in the adder 77, the output of the adder being applied to a Vernier encoder 78 of the type shown in FIG. 11. The output of the Vernier encoder 78 will be a pulse burst signal corresponding to the sum of the numbers to which the signals A and B correspond.

Figure 15:
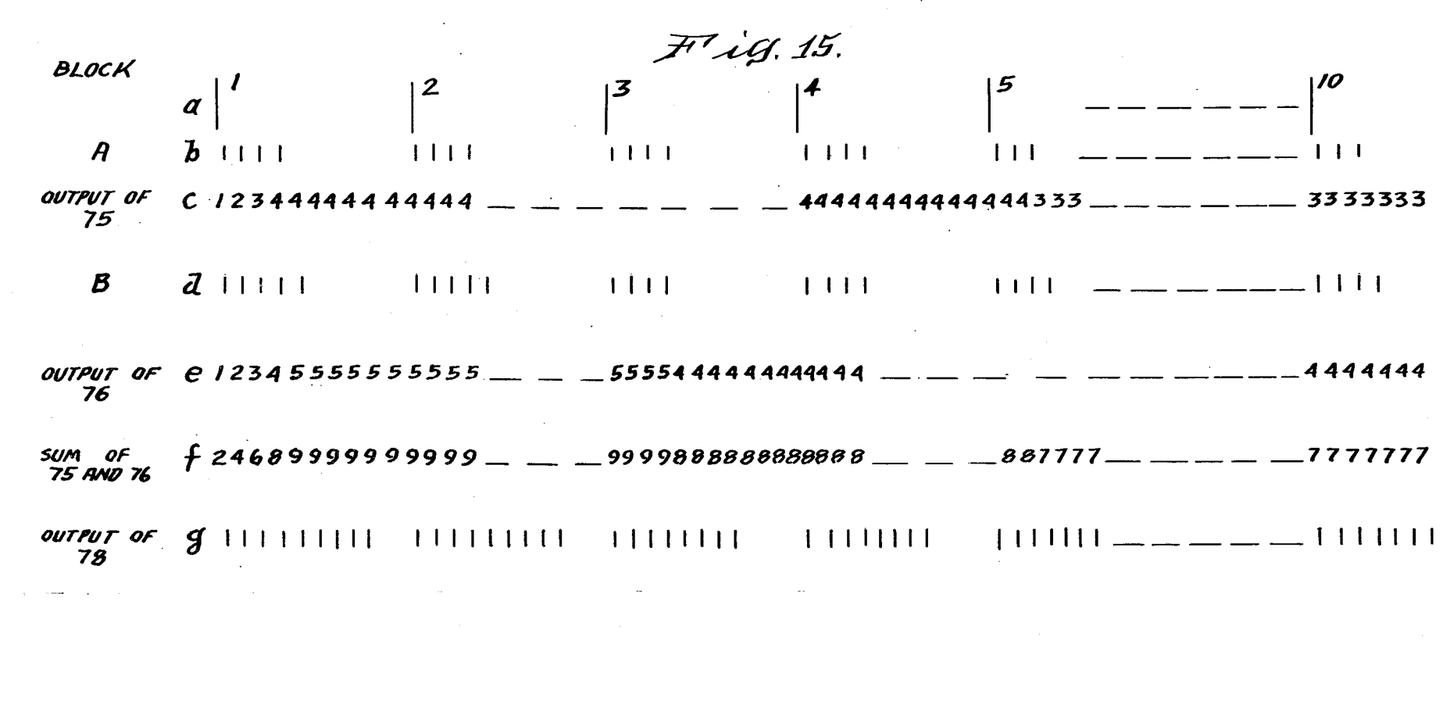
FIG. 15 is a pulse diagram, for explaining the summing operation of the adder of FIG. 14.

The manner of operation of the circuit of FIG. 14 is illustrated in the table of FIG. 15, wherein the operation of the circuit with the numerical example of FIG. 11 is assumed and the initial transient is shown. This figure, line (a) indicates the blocks of the superblocks and lines (b) and (d) represent the signals A and B applied to the block sum registers 75 and 76, respectively. Thus, in the first block the signal A has four pulses in its time slots, and the signal B has five pulses in its time slots. Lines (c)

and (e) represent the output of the block sum registers 75 and 76, i.e., the sums of a number of pulses in the shift registers of the respective block sum registers in the preceding 10 time slots. FIG. 10f represents the sum of the outputs of the block sum registers 75 and 76 at the output of the adder 77. When this sum is compared with the step function signal in the Vernier encoder 78, the output on line 15(g) will be produced in which the first two blocks have nine pulses each, the third and fourth blocks have eight pulses each and the remainder of the blocks have seven pulses each. It is apparent that this corresponds to the output denoted in the arrangement of FIG. 9, and that the output of the circuit hence corresponds to the arithmetic sum of the numbers to which the signals A and B correspond.

In the arrangement of FIG. 14, since an averaging process is employed, it is evident that synchronization of the starts of the superblocks is not necessary, nor is synchronization of the starts of the blocks themselves.

The arrangement of FIG. 14 may also serve as a subtractor, by employing a current subtractor instead of a current adder for the device 77.

In the example illustrated in FIG. 15, the levels assumed at the outputs of the block sum registers and the outputs of the adder are clearly arbitrary, and it is evident that the voltage supplied to the Vernier encoder 78 may be modified by changing the value of the resistor 79 at the output of the adder 77. Thus, scaling (to eliminate overflow) can be obtained by modification of the resistor 79. It should be further noted that a Vernier encoder is not required for the encoder 78 in the arrangement of FIG. 14, since actually a fixed 10 step encoder will suffice.

Figure 16:
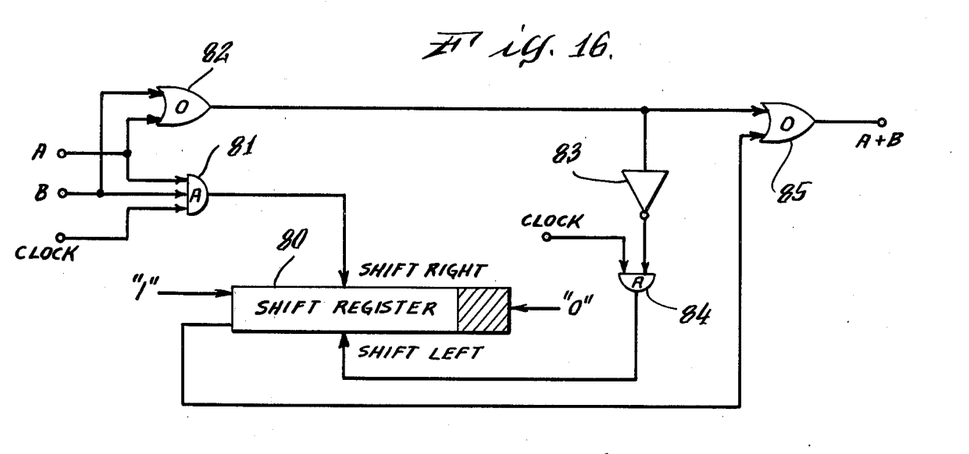
FIG. 16 is a simplified illustration of a logic adding system in accordance with the invention.

In a burst processing system in accordance with the invention adding may also be effected in a logic burst adder, as illustrated in FIG. 16. In this circuit, a shift register 80 is provided, with a logic "1" constant level signal applied to the first stage of the shift register, and a logic "0" constant level signal applied to the last stage of the shift register. The burst signals A and B to be added and the clock signal are applied to a logic adder 81, with the output of this adder being applied to a terminal of the shift register 80 for shifting the contents therein to the right (i.e., toward the stage representing usually the most significant digit). In addition, the burst signals A and B to be added are applied to a logic OR circuit 82. The output of the logic OR circuit 82 is connected, by way of inverted 83, to one input of the logic AND circuit 84. The clock pulses are applied to the other input of the logic AND circuit 84, and the output of the AND circuit 84 is connected to the terminal of the shift register which shifts the contents therein toward the left, i.e., toward the first stage thereof, to which the logic "1" signal is applied. In addition, the output of the logic OR gate 82 and an output at the first stage of the register (i.e., the stage to which the logic "1" signal is applied), are applied to a logic OR circuit 85. The sum of the burst signals appears at the output of the logic OR circuit 85.

In the circuit of FIG. 16, the coincidence of pulses in the A and B burst effect the shifting of the contents of the shift register 80 to the right, to thereby effect the storage in the shift register of a corresponding number of "1's". Such coincidences also result in output pulses, by way of the logic OR gates 82 and 85. When a pulse appears only in one of the signals A or B an output signal is also provided by way of the gates 82 and 85, but in this case no further "1's" are stored in the shift register. In the absence of a pulse in either of the A or B burst of signals, a clock pulse is applied to the shift left terminal of the shift register, to effect the reading out of any "1" signals stored in the stage of the shift register to which the logic "1" signal is applied. Thus, this circuit of FIG. 16 provides a sequence of output pulses having a number of pulses corresponding to the sum of the pulses in the bursts of each of the burst signals A and B. In the arrangement of FIG. 16, overflow must be prevented by scaling.

Figure 17:
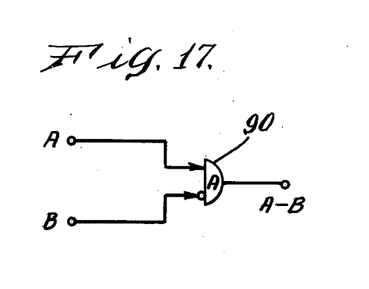
FIG. 17 is an illustration in simplified form of a subtractor in accordance with the invention.

Subtraction can also be effected in a logic circuit, by logically subtracting the pulses of the minuend, until the subtrahend pulses are accounted for. In a simple arrangement of this type, it must be assured that the pulse blocks of the two burst signals are synchronized. For example, logic subtractor circuits as illustrated in FIG. 17 may be comprised of a logic AND circuit 90, with the minuend A applied to one input of the AND gate 90 and the subtrahend pulses B applied to an inverted input of the AND gate 90.

Figure 18:
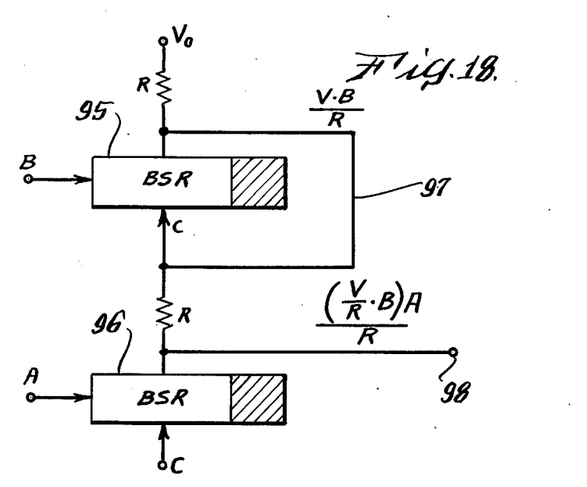
FIG. 18 is a simplified illustration of a multiplier in accordance with the invention.

Assuming that a block sum register provides 1% accuracy for the individual current sources, a simple cascade multiplier of bursts of signals may be provided, including two block sum registers 95 and 96 as illustrated in the FIG. 18. In this arrangement, the pulse burst of sequence B is applied to the first stage of the shift register of the block sum register 95, and the burst of sequence A is applied to first stage of the shift register of the block sum register 96. The voltage supply $V_o$ is applied to the block sum register 95, so that the output of this block sum register 95, so that the output of this block sum register on line 97 corresponds to VB/R. This line serves as the supply for the block sum register 96, so that the output of the block sum register 96 at terminal 98 is proportional to the product of the signals A and B. If desired, a burst signal corresponding to the product may be produced by employing an encoder such as the Vernier encoder illustrated in FIG. 7 and discussed above.

Figure 19:
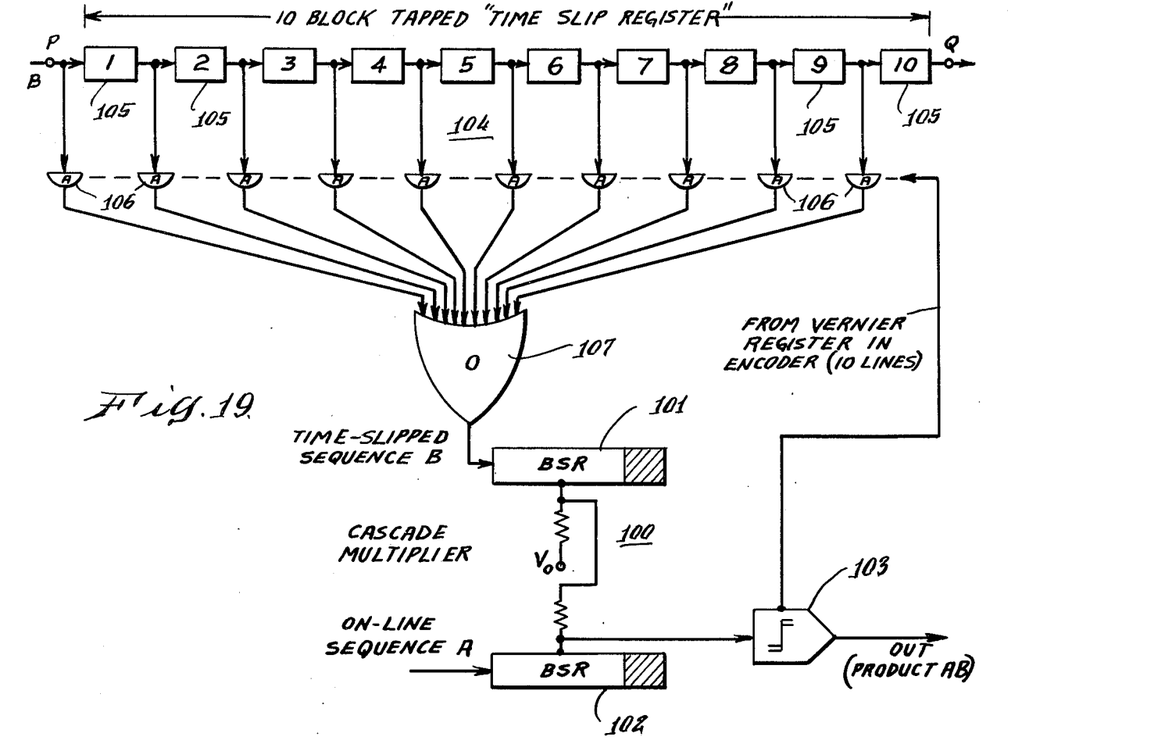
FIG. 19 is a simplified illustration of an improved multiplier in accordance with the invention.

In order to enable multiplication with an accuracy of 1% or better, it is necessary to multiply superblock averages of each of the sequences A and B. A system for effecting such multiplication is illustrated in FIG. 19. In this arrangement, a cascade multiplier 100 of a type illustrated in FIG. 18 is provided, including a block sum register 101, a block sum register 102 and a Vernier encoder 103 connected as illustrated in FIG. 18. Instead of applying the sequence B directly to the input of the block sum register 101, this sequence is applied to a 10 block "TIME SLIP REGISTER" 104, which is formed of 10 cascade connected shift registers 105, each of the shift registers having 10 stages. The inputs of each of the shift registers 105 are connected by way of a separate AND gate 106 to separate inputs of an OR gate 107, and the output of the OR gate is applied to the input of the block sum register 101. The superblock of the sequence B is thus stored in the time slip register 101, and the inputs of the individual shift registers therein are separately gated by the AND gate to the block sum register 101, so that each block of the superblock of the sequence B is multiplied by the superblock of the sequence A. The gating signal for separately gating the data from the time slip register may be derived from the Vernier register in the Vernier encoder 103.

It is apparent that, if the block of sequence A varies slowly, the time slip register of FIG. 19 provides the desired averaging. Thus the arrangement "traps" a whole superblock of the sequence B in a series of 10 shift registers, and multiplies the sequence A with all possible block values of the sequence B. If the value represented by the sequence B is constant, the superblock is repetitive, so that the point P at the input of the first shift register 105 and the output of the last shift register 105 at point Q provide the same information. The superblock is quasi periodic for slow variations in the sequence B.

If the sequence A has highly variable blocks, provision must be made to average this sequence. For example, this may be effected by applying 10 block sum registers in parallel for the register 102, so that each of the block sum registers contributes to the total output current.

Figure 20:
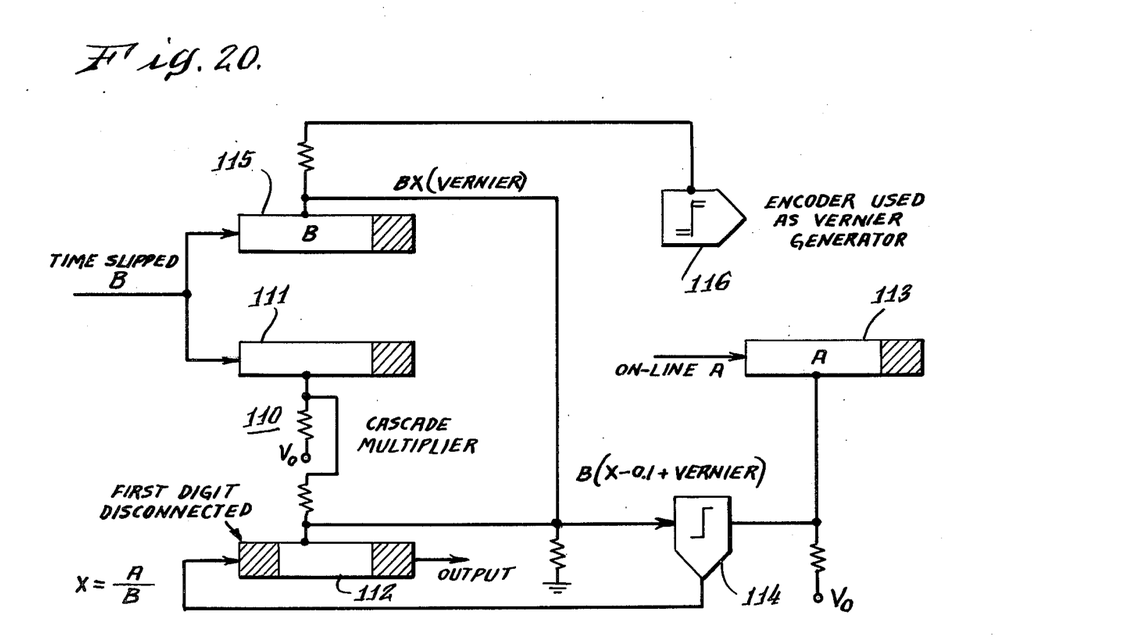
FIG. 20 is a simplified illustration of a divider in accordance with the invention.

A burst dividing system, in accordance with the invention, is illustrated in FIG. 20. This arrangement includes a cascade multiplier 110 including a block sum register 111 and a block sum register 112 connected as in the arrangement of FIG. 18. The sequence B is applied to the input of the block sum register 111. A further block sum register 113 is provided, with the sequence A being applied to the input of this block sum register. The output of the cascade multiplier, i.e., the output of the block sum register 112, and the output of the block sum register 113 are compared in a comparator 114, with the output of the comparator 114 being connected to the input of the shift register of the block sum register 112. It is to be noted that the first stage of the shift register of the block sum register 112 is disconnected, i.e., does not contribute to the current output of this block sum register. In addition, a block sum register 115 is provided to which the sequence B is also applied. The voltage supply for the block sum register 115 is derived from a Vernier encoder 116. Thus, it is apparent that the output of the Vernier register of a Vernier encoder provides a step function that varies incrementally in the blocks of a superblock. The encoder 116 thus may serve as a Vernier generator, by employing the output of the Vernier block sum register as the output of this circuit, for the purposes of the arrangement of FIG. 20.

In the arrangement of FIG. 20, if the product of the sequence B and the input to the block sum register 112 is less than the output of the block sum register 113, an additional "1" will be shifted from the comparator 114 into the block sum register 112 and the desired comparison will be obtained when the output of the block sum register 112 is equal to the output of the block sum register 113, at which time the contents of the block sum register 112 will be proportional to A/B. Consequently, the output of the shift register of the block sum register 112 will correspond to the desired division. The output of the block sum register 115 is also connected to the input of the comparator to which the output of block sum register 112 is also connected, so that the sum at the comparator is increased by 1% of B for each successive block, in order to increase the accuracy of the system. As in the multiplying arrangement of FIG. 19, the inputs to the block sum registers 111 and 115 may be "time slipped", by employing a time slip register, AND gate an OR gate to apply the sequence B, as in the arrangement of FIG. 19. In this arrangement the Vernier encoder 116 provides the second input to the AND gate at the output of the time slip register.

It will be apparent, of course, that the logic design circuits may be also employed for multiplying and dividing pulse burst signals.

In comparing the designs of the adders, subtractors, multipliers and dividers as above discussed, neglecting the consideration of time slip registers, it can be seen that it is never needed to provide more than four block sum registers, a Vernier encoder and a comparator for performing these arithmetic operations. As a consequence, the components in an arithmetic unit incorporating these functions, with appropriate switching of the inputs and the outputs of the block sum registers, to form a general purpose arithmetic unit, are minimal. The cost of an arithmetic unit of this type is substantially less than that of a microcomputer, since the above components correspond roughly to 240 gate equivalents, as compared to a 2,000 gate equivalent in a microcomputer.

Figure 21:
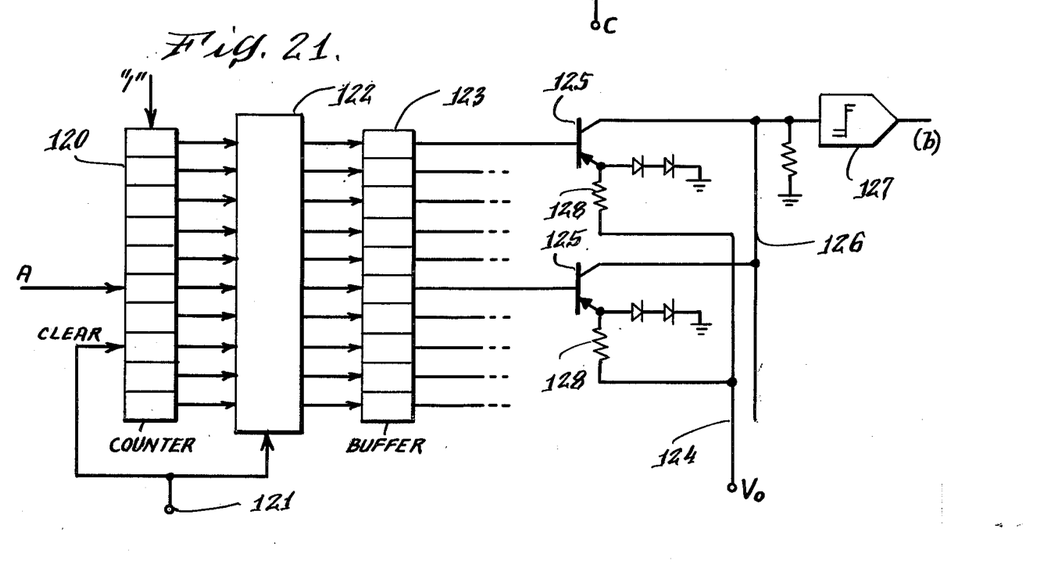
FIG. 21 is a simplified illustration of a function generator in accordance with the invention.

The burst processing technique in accordance with the invention is also adaptable to many other functions. Thus, FIG. 21 illustrates a function generator employing burst processing techniques. This arrangement includes a shift register 120, for example, a 10 stage shift register, which operates as a counter. A constant "1" signal is applied to the first stage, and the burst signal A is applied to the shift register to shift "1's" into the shift register. A signal corresponding to the end of the burst, applied to the terminal 121, is connected to clear the shift register A and open gates 122, to transfer the contents of the stages of the shift register 120 to the corresponding stages of a buffer register 123. The terminal 121 may be connected, for example, to the last stage of the shift register 120. The outputs of the stages of the buffer 123 are connected in a manner similar to that described above with respect to the block sum register, i.e., to a common supply voltage $V_o$ line 124 by way of transistor circuits 125 similar to those employed in a block sum register, with the outputs of the transistors of these circuits being connected to a common current line 126. The current summing line 126 is connected to the input of a Vernier encoder 127, with the output of the Vernier encoder 127 being a burst signal (b) corresponding to the desired encoded function. In this arrangement, the resistors 128 of the transistor circuits 125 have different values, in accordance with the desired function to be generated.

The counter and the buffer together from a concentrator, which may also be considered to be a resynchronizer. Linear interpolation in this arrangement is automatic, if a superblock is considered.

Figure 22:
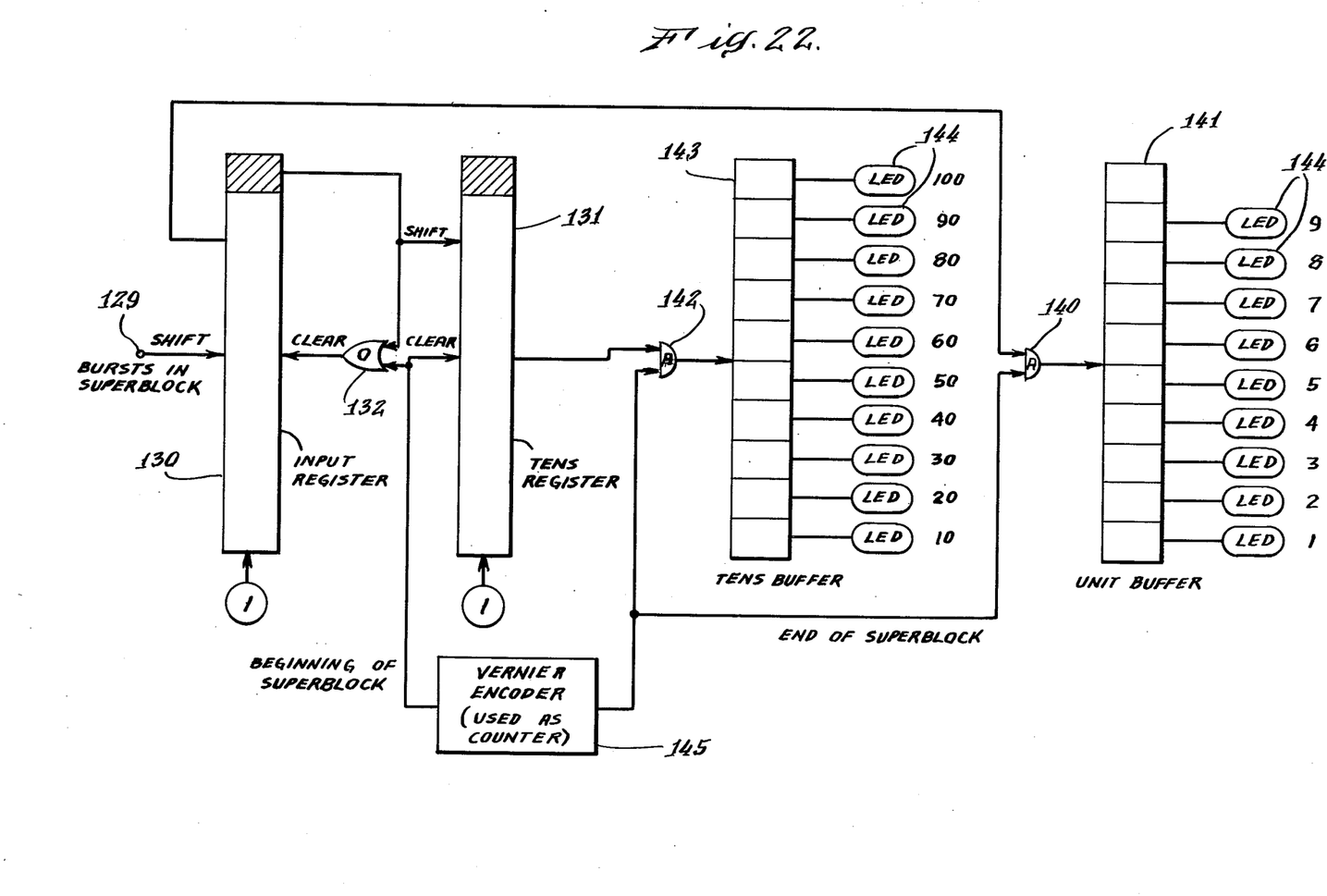
FIG. 22 is a simplified illustration of a burst display system in accordance with the invention.

In a further embodiment of the invention, as illustrated in FIG. 22, burst processing technique may be readily employed to provide a display. In this arrangement, the burst of a superblock to be displayed are applied to the shift terminal 129 of a 10 stage shift register 130. A constant "1" signal is applied to the first stage of this register, and the last stage of this register is connected to the shift terminal of a 10 stage shift register 131. A constant "1" signal is also applied to the first stage of the shift register 131. The last stage of the shift register 130 is connected by way of an OR gate 132 to the clear terminal of this shift register.

The outputs of the stages of the shift register 130 are connected by way of AND gates 140 to the separate stages of a units buffer register 141, and the outputs of the individual stages of the shift register 131 are connected by way of AND gates 142 to the individual stages of a tens buffer register 143. White the AND gates 140 and 142 are illustrated as single AND gates, it will be apparent that many AND gates are actually employed to transfer the contents of each of the registers 130 and 131 to the respective stages of the buffer 141 and 143. The outputs of the buffers 141 and 143 are connected to suitable indicating devices, such as LED's 144.

A Vernier encoder 145 is employed as a counter, to provide a clear signal at the beginning of a superblock. This signal is applied to the OR gate 132 to effect the clearing of the shift register 130, and to the clear terminal of the register 131 to effect the clearing of this register. The Vernier encoder 145 also provides a signal at the end of a superblock, to open the gates 140 and 142, thereby enabling the transfer of the contents of the registers 130 and 132 to the buffers 141 and 143, respectively. As a consequence, the LED's 144 will be energized in correspondence to the bursts of the superblock input signal, The LED's 144 may be arranged in cloumns, as illustrated, to provide a bar graph display. It is, of course, apparent that other forms of indicating devices may be employed, such as a bar graph as display. While the invention has been disclosed and described with reference to a limited number of embodiments, it will be apparent that many variations and modifications may be made therein. For example, the hardware disclosed employed step function signals in the encoding of signals. It will be apparent that, alternatively, ramp signals may be employed for this purpose, and insofar as the broad aspects of the present invention are concerned, ramp signals will be considered to be the equivalent of step function signals. It is therefore intended in the following claims to cover each such variation and modification as falls within the true spirit and scope of the invention.

What is claimed is:

1. A method for processing data comprising producing first pulses in a sequential group of time slots in a predetermined plurality of first adjacent time slot blocks, producing second pulses in a sequential group of time slots in a predetermined plurality of second adjacent time slot blocks, each block having the same number of time slots, whereby the average number of pulses in the predetermined numbers of said first and second time slot blocks represents first and second quantities, and combining the pulses of said predetermined pluralities of first and second time slot blocks to produce a signal representative of a third quantity.

2. Apparatus for processing data comprising means for producing first pulses in a sequential group of tiime slots in a predetermined plurality of at least one first adjacent time slot block, means producing second pulses in a sequential group of time slots in a predetermined plurality of second adjacent time slot blocks, each block of said first and second time slot blocks having the same number of time slots, whereby the average number of pulses in the predetermined numbers of said first and second time slot blocks represents first and second quantities, respectively, and means for combining the pulses of said first and second pluralities of time slot blocks to produce a signal representative of a third quantity.

* * * * *

UNITED STATES PATENT AND TRADEMARK OFFICE
CERTIFICATE OF CORRECTION

PATENT NO. : 4,156,916

DATED : May 29, 1979

INVENTOR(S) : Wolfgang J. Poppelbaum

It is certified that error appears in the above-identified patent and that said Letters Patent are hereby corrected as shown below:

Column 1, line 34, change "10C" to --100--

Column 3, line 31, change "the" to --this--.

Column 4, line 50, change "ock" to --clock--.

Column 5, line 31, change "clcok" to --clock--.

Column 5, line 32, after "to" first occurrence, insert --a--.

Column 6, line 19, change "hyerblock" to --hyperblock--.

Column 7, line 29, change "vernier" to --Vernier--.

Column 7, line 64, after "output" insert --of--.

Column 11, line 66, change "the" to --that--.

UNITED STATES PATENT AND TRADEMARK OFFICE
CERTIFICATE OF CORRECTION

PATENT NO. : 4,156,916

DATED : May 29, 1979

INVENTOR(S) : Wolfgang J. Poppelbaum

It is certified that error appears in the above-identified patent and that said Letters Patent are hereby corrected as shown below:

Column 13, line 20, change "as" second occurrence to --gas--.

Signed and Sealed this

Seventh Day of October 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,156,916
DATED : May 29, 1979
INVENTOR(S) : Wolfgang J. Popelbaum

It is certified that error appears in the above—identified patent and that said Letters Patent is hereby corrected as shown below:

Column 12, line 44, change "from" to --form--.

Signed and Sealed this

Eighth Day of September 1981

[SEAL]

Attest:

Attesting Officer

GERALD J. MOSSINGHOFF
Commissioner of Patents and Trademarks